July 2, 1940.  W. A. DUFFIELD  2,206,859
VARIABLE SPEED TRANSMISSION
Filed July 12, 1938 2 Sheets-Sheet 1

INVENTOR
William A. Duffield
BY
ATTORNEY

July 2, 1940.   W. A. DUFFIELD   2,206,859
VARIABLE SPEED TRANSMISSION
Filed July 12, 1938   2 Sheets-Sheet 2
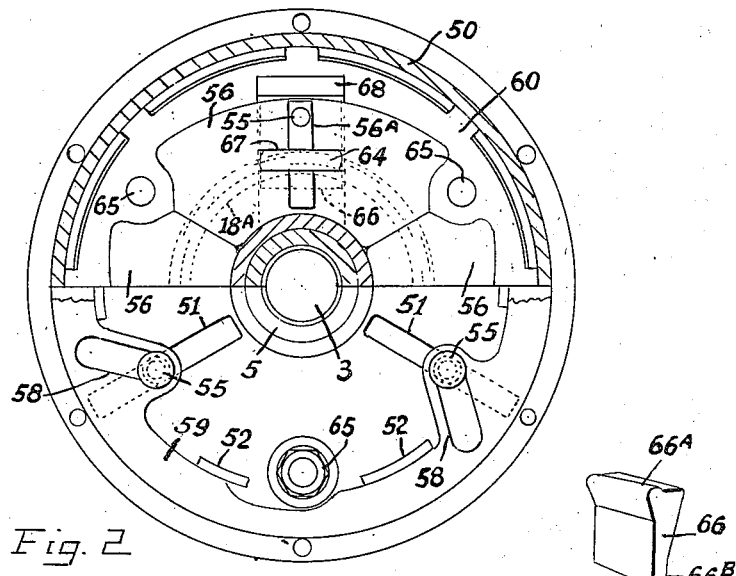
Fig. 2
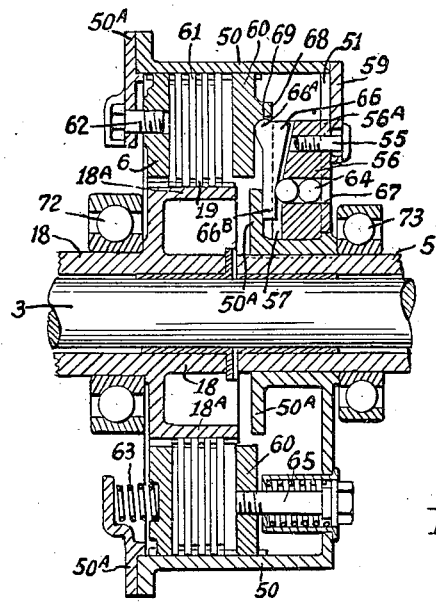
Fig. 3
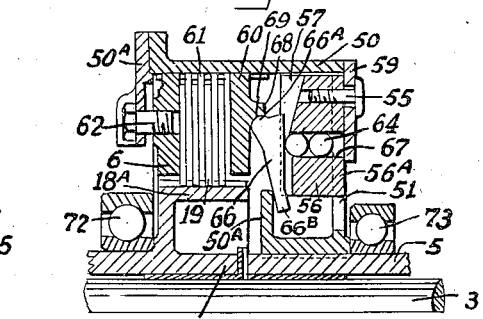
Fig. 4
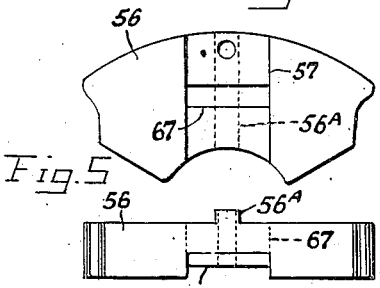
Fig. 5
Fig. 6
Fig. 7
INVENTOR
William A. Duffield
BY
ATTORNEY Patented July 2, 1940

2,206,859

UNITED STATES PATENT OFFICE 2,206,859

VARIABLE SPEED TRANSMISSION

William A. Duffield, Windsor, Ontario, Canada

Application July 12, 1938, Serial No. 218,853

6 Claims. (Cl. 74—189.5)

This invention relates to a variable speed transmission of power from a prime mover to the operating shaft in automobiles and the like.

The object is to provide a simple and compact transmission having three speeds to the forward drive, including a low speed, second speed and high speed, in which the change of speed takes place automatically and also a low speed drive in reverse.

A further object is to provide a transmission in which the reverse drive is obtained through the mechanism of the forward drive.

A further object is to provide a transmission in which a fluid coupling of a modified form of the Fottinger type is employed. This fluid coupling has a double function. First in its function of a primary coupling between the drive shaft and the main shaft of the transmission. Second as an over-running clutch and a means of adjustment of the transmission from the second speed to high speed.

A further object is to provide a mechanical clutch of a novel centrifugal type which at an adjustable predetermined speed couples the drive shaft to the planetary gear.

A further object is to provide an improved form of planetary gear which includes the mechanism for a reverse drive.

In my pending application Serial No. 153,874 filed July 16th, 1937, a crude form of mechanism is set forth by which some of the above objects were secured. But radical changes in each of the main elements and in their combinations will be found in the transmission here specified.

Further objects will be set forth in detail hereinafter.

Reference is made to the accompanying drawings in which:

Figure 2 is a cross section through the mechanical clutch on the line 2—2 of Figure 1 in the upper half and an end view of the mechanical clutch in the lower half.

Figure 3 is an enlarged vertical section of the mechanical clutch in open position.

Figure 4 is a similar vertical section of the mechanical clutch in closed position.

Figure 5 is a side view of one of the weights of the clutch.

Figure 6 is a top view of Figure 5.

Figure 7 is a perspective view of one of the transfer wedges.

Figure 1:
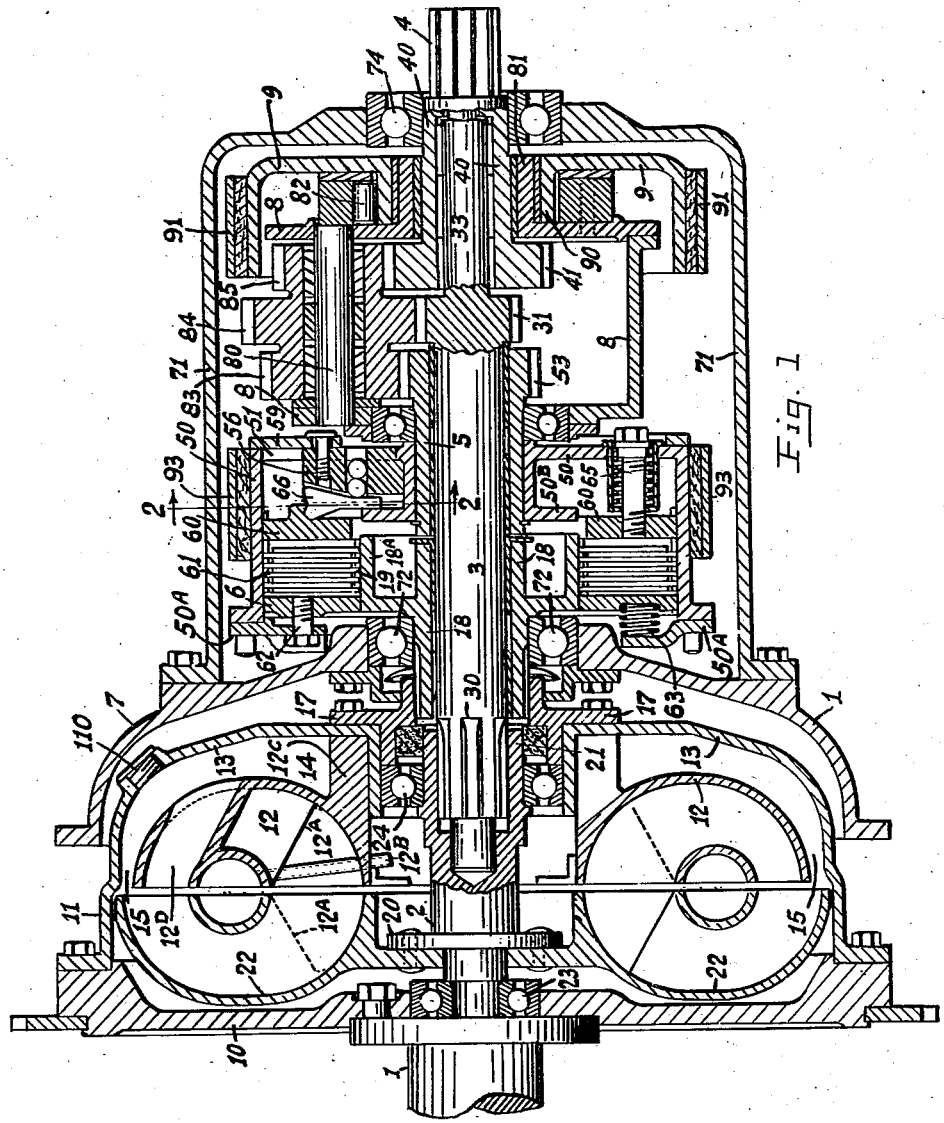
Figure 1 is a vertical section through the axis of the shafts.

As shown in the drawings the device comprises three main elements. A fluid coupling of a modified form of the Fottinger type. An automatic mechanical clutch of the centrifugal type. A planetary gear element controlling the speed and direction of the drive.

The power shaft 1 is bolted to a fly-wheel 10. The fluid coupling here shown is of the unloading and over-running type. In this the driver member has an inner shell 12 and an outer shell 13 with a passage 15 between them. This passage 15 leads to a reservoir 14, and opens at the other end into the working circuit of the fluid coupling. The outer shell 13 has an extension 11 by which it is bolted to the fly-wheel 16. The inner shell 12 has the usual vanes 12A, air tubes 12B, and a set of bosses 12C to which the outer shell 13 is bolted. The inner shell 12 has also a series of direct passages 12D leading from the passage 15 into the area of the working circuit. The outer shell 13 has a capped fluid inlet 110. The runner member has a shell 22 of the same diameter as the outer shell 13, providing a clear opening into the passage 15 of the driving member. The shell 22 has vanes 22A. A stub shaft 2 is journalled at one end in bearings 23 in the fly-wheel 10, and near the other end in bearings 24 within the outer shell 13. This stub shaft 2 has a flange 20 to which is secured the runner member 22. The end 21 of the stub shaft 2 is bored and splined. The main shaft 3 has a splined end 30 which enters the splined bore 21 of the stub shaft 2. The main shaft 3 has a pinion 31, and an extension 33. The tail shaft 4 is journalled in bearings 76, in the casing 71, and has a sleeve 40 in which the extension 33 of the main shaft 3 is journalled. The sleeve 40 has a pinion 41. Journalled on the shaft 3 is a sleeve 18. The main casing 7 extending over the driver member of the fluid coupling carries a bearing 72 around the sleeve 18. A flanged sleeve 17 is bolted to the bosses 12C of the driver member and is splined to the sleeve 18. The sleeve 18 carries a flanged disc 18A on which are mounted a set of clutch driving discs 19. Beyond the sleeve 18 and also journalled on the shaft 3 is a sleeve 5 having a pinion 53. Keyed to the sleeve 5 is the clutch carrier 50 having an end plate 50A bolted to its outer end. Mounted within the carrier 50 is the back plate 6 of the clutch. The driven discs 61 are secured to the carrier 50 in slots. The presser plate 60 is slidingly mounted in the carrier. The back plate 6 is controlled by a set of springs 63 and adjusting screws 62 through the end plate 50A. The clutch is operated by the centrifugal action of a set of weights 56. These weights 56 have projections 56A which enter slots 51 in the carrier 50 to direct their outward movements. The movements of the different weights 56 are synchronized by a synchronizing ring 59 centered by guides 52 on the carrier 50. The ring 59 has slots 58 and pins 55 through the slots 58 and 51 screwed into the weights 56 keep their radial movements equal. The weights 56 have grooves 57, to hold transfer wedges 66. The weights 56 have slots 67 in which are mounted a pair of rollers 64. These rollers 64 bear on the wall of the carrier 50 and on the transfer wedges 66. The carrier 50 has a disc extension 50B. The presser plate 60 has a flange 68 providing a rounded groove 69. The transfer wedges 66 have rounded edges 66A fitting the grooves 69. The inner end 66B of the wedges 66 bears loosely on the disc 50B. The position of the presser plate 60 is controlled by a set of spring assemblies 65. The clutch carrier 50 has a brake band 93 whereby in reverse drive the pinion 53 of the sleeve 5 is held from rotation. In the gearing element as shown in Figure 1 the main shaft 3 has a pinion 31. A planetary gear carrier 8 has a sleeve 81 journalled on the sleeve 40 of the tail shaft 4 at one end, and is journalled at the other end on the bearing 73 on the sleeve 5. The carrier 8 has a set of pins 80 on which are journalled sets of integral gear 83, 84 and 85. The large middle gear 84 meshes with the pinion 31 of the main shaft 3. The small gear 85 meshes with the pinion 41 on the tail shaft 4. The intermediate gear 83 meshes with the pinion 53 on the sleeve 5, thus connecting the gearing to the mechanical clutch as described elsewhere. Secured to the end of the carrier 8 is an over-running clutch ring 82. This clutch bears on a flanged sleeve 90 of a brake drum 9 controlled by a brake band 91. The sleeve 90 is journalled on the sleeve 81 of the carrier 8. By means of this clutch the carrier 8 can be held from reverse rotation.

The operation of the transmission is as follows:

In starting the brake band 91 is held while the brake band 93 is loose. When the shaft 1 is rotated it carries with it the fly-wheel 10 and the driver member of the fluid coupling. The fluid in the coupling begins to circulate and gradually the runner member is speeded up. This rotation is carried through the stub shaft 2 and the main shaft 3 to the pinion 31. The gears 84 and 85 are driven in reverse but the carrier 8 is held from reverse rotation by the over-running clutch. The small gear 85 drives the pinion 41 of the tail shaft 4 at reduced or low speed. But while this is taking place the gear 83 is rotating the pinion 53, sleeve 5 and clutch carrier 50. This rotation tends to move the weights 56 outwardly to engage the clutch. This tendency is controlled by the adjustable spring assemblies 65 which hold the weights from starting to move outwards till a predetermined speed of rotation is reached. The transfer wedges 66 in their disengaged position also provide steep inclines and increased leverage against the outward movement of the weights. As the weights 56 overcome this resistance and start to travel outwards, they force the transfer wedges 66 to rock in the grooves 69 and over the edge of the disc 50B and move the presser plate 60 towards the back plate 6. In doing this the angle of the surface of the wedges 66 is gradually reduced and the resistance of the spring 65 is neutralized. At the same time the rollers 64 of the weights 56, mounting the surface of the wedges 66 gradually increase their effective pressure on the presser plate 60 to complete the closing of the clutch as shown in Figure 4. In this position, any tendency of the clutch to spring open is practically eliminated. The clutch will therefore slow down without disengaging to a much slower speed than that required to engage it. Furthermore when the weights start to travel outwards they will continue until they close the clutch without increased speed or any shock. By closing of the mechanical clutch the sleeve 5 and pinion 53 are coupled to the drive shaft and are therefore rotated at drive speed. Through the gears 83 and 84 this drive will rotate the main shaft 3 and runner member 22 at a higher rate of speed than that of the driver member. The flow of fluid circulating in the working circuit of the coupling first slows down and allows the slip between the members to reach a maximum, whereby the runner member over-runs the driver member. When the fluid in the working circuit begins to flow in the opposite direction a portion of it passes into the passage 15 to the reservoir 14. At this point the drive of the tail shaft is in second speed. When the drive speed is accelerated, the fluid remaining in the working circuit by its increased centrifugal action tends to bring the speeds of the driver and runner members practically together. The fluid in the reservoir also returns to the working circuit through the passage 15. With the fluid coupling thus closed at high speed the planetary gear ceases to function as such and merely couples the drives through the main shaft and the mechanical clutch to the tail shaft which is driven at drive speed. In slowing down the reverse steps take place and the mechanical clutch opens and the drive is through the planetary gear. The reverse drive is obtained by holding the brake band 93 and with it the carrier 50, sleeve 5 and pinion 53. The brake band 91 is released. The drive of the pinion 31 rotates the planetary gear in reverse but as the pinion 53 is held the gear 84 rotates around it driving the carrier 8 in reverse. The small gear therefore drives the tail shaft 4 in reverse at slow speed.

A special feature of the fluid coupling as shown, is that of providing the direct passages 12D through the inner shell 12 of the driver member. When a considerable quantity of fluid has been accumulated in the reservoir 14, and the rotation of the driver member causes it to pass back through the passage 15 to the working circuit of the coupling, the flow of the fluid already in the working circuit has a tendency as it passes the outlet of the passage 15 to stop and cut off the flow from the passage 15 leaving considerable fluid undischarged. By means of the direct passages 12D this remaining fluid is then drawn or siphoned out and passes to the working circuit.

I claim:

1. In an automatic variable speed transmission, having three separable elements, comprising a fluid coupling element including a drive shaft, a fly-wheel, driver and runner members of the fluid coupling and a stub shaft, a planetary gear element including a main shaft with a pinion, a tail shaft with a pinion, a carrier having an over-running clutch controlled by a brake drum and brake band, sets of triple integral planetary gear journalled on pins in the carrier, two of the gears of the sets meshing with the pinions of the main and tail shafts respectively, and a mechanical clutch element including a multiple disc clutch operated by the centrifugal action of weights moving in radiating paths and at adjustable speeds, adapted to couple the driver member of the fluid coupling with a pinion meshing with the third gears of the sets of planetary gear.

1. In an automatic variable speed transmission having three speeds in forward drive and a reverse drive, comprising a drive shaft, a fly-wheel, a fluid coupling of the Fottinger type, its driver member secured to the fly-wheel, its runner member secured to a stub shaft, a main shaft splined to the stub shaft having a pinion and an extension, a tail shaft journalling the extension and having a pinion, a planetary gear carrier journalled about the main and tail shafts having an over-running clutch controlled by a brake drum and brake band, sets of triple integral planetary gear journalled on pins in the carrier, the large gears of the sets meshing with the pinion of the main shaft, the small gears of the sets meshing with the pinion of the tail shaft, and an adjustable mechanical clutch journalled about the main shaft and adapted to couple the driver member of the fluid coupling with a pinion meshing with the third or intermediate size gears of the sets at a pre-determined speed.

3. In an automatic variable speed transmission having three speeds in forward drive and a reverse drive, comprising a drive shaft, a fly-wheel, a fluid coupling of the Föttinger type, its driver member secured to the fly-wheel, its runner member secured to a stub shaft, a main shaft splined to the stub shaft having a pinion and an extension, a tail shaft journalling the extension and having a pinion, a planetary gear carrier journalled about the main and tail shafts having an over-running clutch controlled by a brake drum and brake band, sets of triple integral planetary gear journalled on pins in the carrier, the large gears of the sets meshing with the pinion of the main shaft, the small gears of the sets meshing with the pinion of the tail shaft, and an adjustable mechanical clutch journalled about the main shaft comprising a disc clutch, one set of discs connected to the driver member of the fluid coupling, the other set of discs mounted on a clutch carrier having a back plate and a slidably mounted and adjustable spring controlled presser plate, the clutch carrier keyed to a sleeve journalled on the main shaft and having a pinion meshing with the third or intermediate size gears of the sets, a set of weights mounted in radiating slots in the clutch carrier, transfer wedges between the weights and the presser plate, and a pair of rollers mounted in slots in the weights bearing on the transfer wedges and on the clutch carrier.

4. In an automatic variable speed transmission having three separable elements including a fluid coupling element, a planetary gear element and an adjustable mechanical clutch element, the fluid coupling element comprising a drive shaft, a fly-wheel, driver and runner members of the fluid coupling, the driver member having an inner vaned shell and an outer shell, providing a passage from the periphery of the member to a reservoir between the inner walls of the shells, the runner member having a vaned shell extending outwardly the same diameter as that of the outer shell of the driver member and over the mouth of the passage from the reservoir, the driver member connected to one side of the mechanical clutch element, the runner member connected to the planetary gear element through a stub shaft and a main shaft having a pinion, a tail shaft having a pinion, and sets of triple integral planetary gear mounted in a planetary gear carrier, two of the gears of the sets of gear meshing with the pinions of the main and tail shafts respectively and the third gears of the sets meshing with a pinion connected with the other side of the mechanical clutch.

5. In an automatic variable speed transmission having three separable elements, including a fluid coupling element, having driver and runner members, a planetary gear element, having a carrier controlled by a brake drum through a one way clutch, and an adjustable mechanical clutch element, a stub shaft and a main shaft connecting the fluid coupling element to the planetary gear element, the mechanical clutch comprising a disc clutch, one set of discs mounted on a sleeve journalled on the main shaft, which is keyed to the driver member of the fluid coupling, the other set of discs mounted on a clutch carrier, keyed to a sleeve journalled on the main shaft, having a pinion meshing with the planetary gear, a back plate adjustably spring supported on the clutch carrier, a presser plate slidably mounted in the clutch carrier and having a spring control adjustable from the clutch carrier, a sets of weights having projections mounted in radiating slots in the clutch carrier, a synchronizing ring mounted on guides on the clutch carrier, having a set of slots, pins screwed to the weights passing through the slots of both the ring and carrier, transfer wedges in recesses in the weights, having rounded edges fitting grooves in the presser plate, the weights having slots in which a pair of rollers are mounted to bear on the carrier wall at one end, and on the transfer wedges at the other end, the clutch carrier having a disc extension, on which the inner ends of the wedges bear loosely, whereby as the weights move outwardly the wedges tilt on the disc extension and flatten toward the rollers, the mechanical clutch, when closed adapted to couple the driver member of the fluid coupling to the planetary gear.

6. In an automatic variable speed transmission a casing, a drive shaft, a fly-wheel, a fluid coupling having driver and runner members, the driver member having an inner vaned shell and an outer shell providing a passage from the periphery of the member to a reservoir between the inner walls of the shells, direct passages through the inner shell to the working circuit of the coupling, the runner member having a vaned shell and extending outwardly to the diameter of the outer shell of the driver member and over the mouth of the passage to the reservoir, a stub shaft journalled in the fly-wheel and in bearings within the reservoir, having a flange bolted to the runner member, a main shaft splined in the bored end of the stub shaft at one end, having a pinion and an extension, a tail shaft journalled in the casing and bored to journal the extension of the main shaft, having a pinion, a planetary gear carrier journalled about the main and tail shafts, sets of triple integral planetary gear journalled on pins in the carrier, the large middle gears of the sets meshing with the pinion of the main shaft, the small end gears of the sets meshing with the pinion of the tail shaft, an over-running clutch ring secured to the end of the carrier bearing on the sleeve of a brake drum controlled by a brake band, and an adjustable centrifugal clutch, one side of which is mounted on a sleeve journalled on the main shaft, which is splined to a flanged sleeve bolted to the driver member of the fluid coupling, the other side of the centrifugal clutch being keyed to a sleeve journalled on the main shaft having a pinion which meshes with the intermediate size end gears of the sets of gear in the planetary gear carrier.

WILLIAM A. DUFFIELD.